United States Patent
Kanamura et al.

(10) Patent No.: US 8,870,327 B2
(45) Date of Patent: Oct. 28, 2014

(54) THREE-DIMENSIONAL PRINTING DEVICE, THREE-DIMENSIONAL PRINTING SYSTEM AND THREE-DIMENSIONAL PRINTING METHOD

(75) Inventors: Toshiaki Kanamura, Ome (JP); Hisao Aihara, Fuefuki (JP)

(73) Assignees: Casio Electronics Manufacturing Co., Ltd., Iruma-shi, Saitama (JP); Casio Computer Co., Ltd., Tokyo (JP)

( * ) Notice: Subject to any disclaimer, the term of this patent is extended or adjusted under 35 U.S.C. 154(b) by 452 days.

(21) Appl. No.: 13/402,191

(22) Filed: Feb. 22, 2012

(65) Prior Publication Data

US 2012/0218338 A1 Aug. 30, 2012

(30) Foreign Application Priority Data

Feb. 24, 2011 (JP) .................................. 2011-038184

(51) Int. Cl.
- B41J 2/205 (2006.01)
- B41J 11/00 (2006.01)
- B41M 3/00 (2006.01)
- B41M 7/00 (2006.01)
- B41J 3/407 (2006.01)

(52) U.S. Cl.
CPC .............. *B41M 7/009* (2013.01); *B41J 11/002* (2013.01); *B41M 3/00* (2013.01); *B41J 3/407* (2013.01)
USPC ......................................................... 347/15

(58) Field of Classification Search
CPC ........ B41J 3/407; B41J 11/002; B41M 7/009; B41M 3/00
USPC .............. 430/295; 156/67; 427/272; 358/1.9; 428/39; 264/413; 347/15
See application file for complete search history.

(56) References Cited

U.S. PATENT DOCUMENTS

| | | | |
|---|---|---|---|
| 4,113,487 A * | 9/1978 | Matsunaga et al. ........... | 430/295 |
| 4,769,257 A | 9/1988 | Duley et al. | |
| 5,122,430 A | 6/1992 | Nishitsuji et al. | |

(Continued)

FOREIGN PATENT DOCUMENTS

| CN | 1301448 C | 2/2007 |
|---|---|---|
| CN | 101282369 A | 10/2008 |

(Continued)

OTHER PUBLICATIONS

Chinese Office Action dated Jan. 30, 2014 (and English translation thereof) in counterpart Chinese Application No. 201210045719.8.

*Primary Examiner* — Laura Martin
*Assistant Examiner* — Carlos A Martinez
(74) *Attorney, Agent, or Firm* — Holtz, Holtz, Goodman & Chick PC (57) ABSTRACT

Desired designated sections are selectively extracted from a color image to be printed, the extracted designated sections are converted into a solid black image having a high thermal energy absorbency, and the solid black image is printed on the foaming layer surface of a supplied thermal expansion sheet. Next, thermal energy is applied by a halogen lamp in a thermal expansion processing unit, causing the solid black image section to expand and rise. Furthermore, in an ink jet printer unit, a prescribed color that is a background color is printed on the entire foaming layer surface of the thermal expansion sheet including the raised sections. Furthermore, the color image to be printed is printed thereon by an ink jet recording method to obtain color image three-dimensional printed material.

20 Claims, 7 Drawing Sheets

(56) References Cited

U.S. PATENT DOCUMENTS

| | | | |
|---|---|---|---|
| 5,470,410 A * | 11/1995 | Keating et al. | 156/63 |
| 6,063,444 A * | 5/2000 | Dax | 427/272 |
| 7,265,871 B2 * | 9/2007 | Ishii et al. | 358/1.9 |
| 2004/0036922 A1 | 2/2004 | Yamada et al. | |
| 2008/0248290 A1 | 10/2008 | Hsu et al. | |
| 2009/0246436 A1 * | 10/2009 | Gorin et al. | 428/39 |
| 2014/0110887 A1 * | 4/2014 | Horiuchi | 264/413 |

FOREIGN PATENT DOCUMENTS

| | | |
|---|---|---|
| JP | 54-89638 A | 7/1979 |
| JP | 2001-150812 A | 6/2001 |
| JP | 2005-343059 A | 12/2005 |
| JP | 2008-188826 A | 8/2008 |

* cited by examiner

THREE-DIMENSIONAL PRINTING DEVICE, THREE-DIMENSIONAL PRINTING SYSTEM AND THREE-DIMENSIONAL PRINTING METHOD

CROSS-REFERENCE TO RELATED APPLICATION

This application claims the benefit of Japanese Patent Application No. 2011-038184, filed Feb. 24, 2011, the entire disclosure of which is incorporated by reference herein.

FIELD

This application relates generally to a three-dimensional printing device, three-dimensional printing system and three-dimensional printing method that creates printed material in which desired sections of a color image are made three-dimensional.

BACKGROUND

In the past, three-dimensional printing has been realized through Braille printing, a layering technique through UV ink, a physical pressing method, a three-dimensional printer and/or the like. For example, a method of forming three-dimensional images by using thermal expansion sheets made of thermal expansion microspheres of material with a low boiling point microencapsulated by thermoplastic resin, forming an image using for example black toner with a high thermal energy absorbency on this thermal expansion sheet, exposing the entire surface uniformly to strong light and selectively heating parts of the image through differences in light absorption to create a three-dimensional image has been known in Unexamined Japanese Patent Application KOKAI Publication No. S54-089638. However, with this pioneering technology, essentially no mention is made of coloring the three-dimensional image.

Hence, in Unexamined Japanese Patent Application KOKAI Publication No. 2001-150812, besides forming a planar image such as a color image on the surface of a foam sheet, a light-absorbing pattern for shaded images is formed on the back surface of the base layer of the foam sheet on the basis of distant image data in which a three-dimensional shape related to the planar image is expressed. A foam molding method is proposed through a printed foam sheet with a high degree of freedom in the bulge amount by shining light on this from the base layer side, generating heat in accordance with the shading of the image, and causing the foam sheet to expand and bulge in accordance with distant image data.

However, the conventional three-dimensional image formation methods described in the above-described Unexamined Japanese Patent Application Kokai Publication No. S54-089638 and Unexamined Japanese Patent Application Kokai Publication No. 2001-150812 have a variety of problems, such as requiring time to create three-dimensional printing, having numerous processes and requiring much labor, and accordingly, the devices become complicated and costs increase.

Not only that, but the three-dimensional image formation methods of the above-described Unexamined Japanese Patent Application KOKAI Publication No. S54-089638 and Unexamined Japanese Patent Application KOKAI Publication No. 2001-150812 all produce the image surface by first forming the image and then causing thermal expansion, so cracks can form in the surface of the image after expansion. As a result, the problem exists that the image quality of the three-dimensional image drops markedly.

SUMMARY

In consideration of the foregoing, it is an object of the present invention to provide a three-dimensional printing device, a three-dimensional printing system and a three-dimensional printing method compatible with color images that can create printed material in which desired section of a color image are made three-dimensional at high quality, easily and at low cost.

In order to achieve the above-described objective of this invention, the three-dimensional printing device according to this invention comprises an image extractor that extracts selectively designated section from an image to be printed; an image converter that converts the designated section extracted by the image extractor into an image with a color having a higher thermal energy absorbency than section other than the designated section; a converted image printer that prints the converted image converted by the image converter onto a foaming layer surface of a thermal expansion sheet; a sheet surface raiser that applies thermal energy to the thermal expansion sheet on which the converted image is printed by the converted image printer, and causes the printed section of the converted image to expand and rise; a background color printer that prints a prescribed color that is a background color on the surface of the foaming layer surface of the thermal expansion sheet containing section raised by the sheet surface raiser; and an image printer that prints the image to be printed on the surface on which the prescribed color was printed by the background color printer.

The three-dimensional printing device according to the present invention comprised as described above is comprised such that the image in the color having the higher thermal energy absorbency is a solid black image and the prescribed color is white.

In addition, in the three-dimensional printing device according to the present invention comprised as described above, the image to be printed is a color image.

In addition, the three-dimensional printing device according to the present invention comprised as described above further comprises a sheet supplier that supplies the thermal expansion sheet.

In order to achieve the above-described objective of this invention, the three-dimensional printing system according to this invention comprises an image extractor that extracts selectively designated section from an image to be printed; an image converter that converts the designated section extracted by the image extractor into an image with a color having a higher thermal energy absorbency than section other than the designated section; a converted image printer that prints the converted image converted by the image converter onto a foaming layer surface of a thermal expansion sheet; a sheet surface raiser that applies thermal energy to the thermal expansion sheet on which the converted image is printed by the converted image printer, and causes the printed section of the converted image to expand and rise; a background color printing device that prints a prescribed color that is a background color on the surface of the foaming layer surface of the thermal expansion sheet containing section raised by the sheet surface raiser; and an image printing device that prints the image to be printed on the surface on which the prescribed color was printed by the background color printer.

In addition, the three-dimensional printing system according to the present invention comprised as described above is comprised such that the image in the color having the higher thermal energy absorbency is a solid black image and the prescribed color is white.

In addition, the three-dimensional printing system according to the present invention comprised as described above is preferably comprised such that the image to be printed is a color image.

In order to achieve the above-described objective of this invention, the three-dimensional printing method according to this invention is a three-dimensional printing method comprising: extracting selectively designated section from an image to be printed; converting the designated section that were extracted into an image with a color having a higher thermal energy absorbency than section other than the designated section; printing the converted image that was converted onto a foaming layer surface of a thermal expansion sheet; applying thermal energy to the thermal expansion sheet on which the converted image is printed, and causing the printed section of the converted image to expand and rise; printing a prescribed color that is a background color on the surface of the foaming layer surface of the thermal expansion sheet containing section that were raised; and printing the image to be printed on the surface on which the prescribed color was printed.

In addition, the three-dimensional printing method according to the present invention comprised as described above is comprised such that wherein the image in the color having the higher thermal energy absorbency is a solid black image and the prescribed color is white, and furthermore the image to be printed is a color image.

In order to achieve the above-described objective of this invention, the three-dimensional printing device according to this invention comprises an image extractor that extracts selectively designated sections having differing degrees of rising from an image to be printed; an image converter that converts the designated sections extracted by the image extractor into a first color image having a higher thermal energy absorbency than section other than the designated sections, and a second color image having a higher thermal energy absorbency than the first color image; a converted image printer that prints the converted image converted by the image converter onto a foaming layer surface of a supplied thermal expansion sheet; a sheet surface raiser that applies thermal energy to the thermal expansion sheet on which the converted image is printed by the converted image printer, and causes the printed sections of the converted image to expand and rise; a background color printer that prints a prescribed color that is a background color on the surface of the foaming layer surface of the thermal expansion sheet containing sections raised by the sheet surface raiser; and an image printer that prints the image to be printed on the surface on which the prescribed color was printed by the background color printer.

Furthermore, the three-dimensional printing device according to the present invention comprised as described above is comprised such that the first color image is a solid gray image, the second color image is a solid black image and the prescribed color is white.

In addition, the device should be comprised such that the image to be printed is a color image. In addition, the three-dimensional printing device according to the present invention comprised as described above further comprises a sheet supplier that supplies the thermal expansion sheet.

In addition, the three-dimensional printing system according to this invention comprised as described above comprises an image extractor that extracts selectively designated sections having differing degrees of rising from an image to be printed; an image converter that converts the designated sections extracted by the image extractor into a first color image having a higher thermal energy absorbency than section other than the designated sections, and a second color image having a higher thermal energy absorbency than the first color image; a converted image printing device that prints the converted image converted by the image converter onto a foaming layer surface of a thermal expansion sheet; a sheet surface raising device that applies thermal energy to the thermal expansion sheet on which the converted image is printed by the converted image printer, and causes the printed sections of the converted image to expand and rise; a background color printing device that prints a prescribed color that is a background color on the surface of the foaming layer surface of the thermal expansion sheet containing sections raised by the sheet surface raiser; and an image printing device that prints the image to be printed on the surface on which the prescribed color was printed by the background color printer.

In addition, in the three-dimensional printing system according to this invention comprised as described above, the first color image is a solid gray image, the second color image is a solid black image and the prescribed color is white. Furthermore, the image to be printed is a color image.

In order to achieve the above-described objective of this invention, the three-dimensional printing method according to this invention is a three-dimensional printing method comprising: extracting selectively designated sections having differing degrees of rising from an image to be printed; converting the designated sections that were extracted into a first color image having a higher thermal energy absorbency than section other than the designated sections, and a second color image having a higher thermal energy absorbency than the first color image; printing the converted image that was converted onto a foaming layer surface of a thermal expansion sheet; applying thermal energy to the thermal expansion sheet on which the converted image is printed, and causing the printed sections of the converted image to expand and rise; printing a prescribed color that is a background color on the surface of the foaming layer surface of the thermal expansion sheet containing raised sections; and printing the image to be printed on the surface on which the prescribed color was printed.

In addition, the three-dimensional printing method according to this invention comprised as described above is comprised such that the first color image is a solid gray image, the second color image is a solid black image and the prescribed color is white.

In addition, the image to be printed is preferably a color image.

In this manner, with the three-dimensional printing device, three-dimensional printing system and three-dimensional printing method according of the present invention, it is possible to create printed material in which desired sections of a color image are made three-dimensional at high quality, easily and at low cost.

BRIEF DESCRIPTION OF THE DRAWINGS

A more complete understanding of this application can be obtained when the following detailed description is considered in conjunction with the following drawings, in which.

DETAILED DESCRIPTION

The preferred embodiments of the present invention are described in detail below with reference to the drawings.

Figure 1:
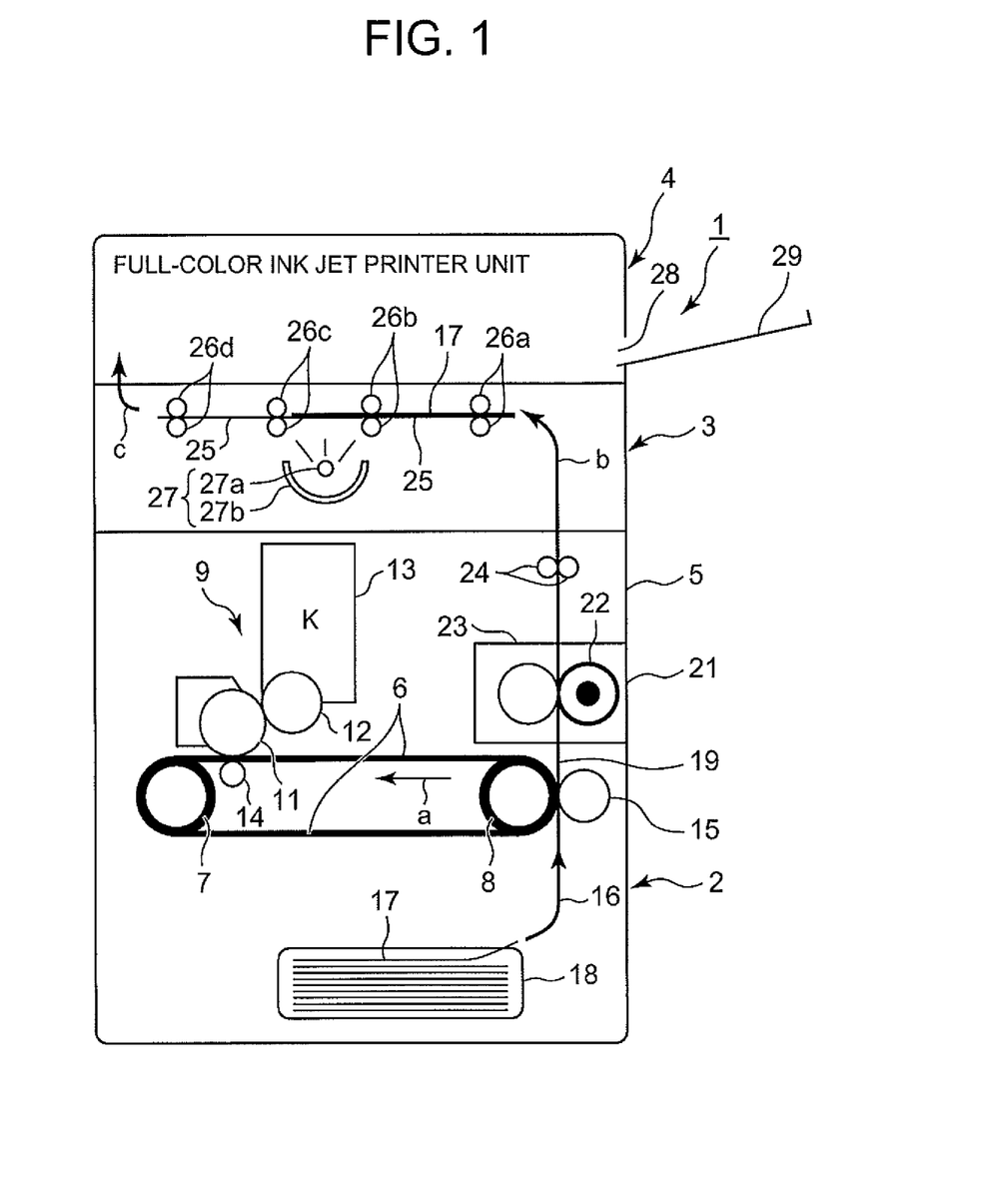
FIG. 1 is a cross-sectional view schematically showing the internal composition of a three-dimensional printing device as one embodiment of the present invention.

FIG. 1 is a cross-sectional view schematically showing the internal composition of a three-dimensional printing device according to an embodiment of the present invention. As shown in FIG. 1, the three-dimensional printing device 1 is composed of a solid image printing unit 2 at the very bottom, a thermal expansion processing unit 3 above this, and an ink jet printer unit 4 at the very top.

The solid image printing unit 2 in this example utilizes an electronic photograph image creation method. Furthermore, in the internal center of a device casing 5, an endless transfer belt 6 is provided, extending in the horizontal direction. The transfer belt 6 is looped over a drive roller 7 and a following roller 8 while being stretched by an unrepresented stretching mechanism, is driven by the drive roller 7, and moves cyclically in a counterclockwise direction as indicated by an arrow "a" in the drawing.

A photosensitive drum 11 of an image creation unit 9 is positioned touching the top cyclical moving surface of the transfer belt 6. A developing roller 12 is positioned adjacent to the photosensitive drum 11 so as to enclose the surface thereof, and is connected to a cleaner, initializing charger and optical writing head omitted from the drawing.

The above-described developing roller 12 is positioned at the side opening of a toner container 13. Inside the toner container 13, black toner K is stored. The black toner K is made up of non-magnetic component toner.

The above-described developing roller 12 has on the surface a thin layer of the black toner K stored in the toner container 13, and develops an image of black toner K on an electrostatic latent image formed on the surface of the photosensitive drum 11 by an optical writing head.

A primary transfer roller 14 is pressed against the bottom of the photosensitive drum 11 via the transfer belt 6, and here a primary transfer unit is formed. A bias voltage is supplied from an unrepresented bias power source to the primary transfer roller 14.

The primary transfer roller 14 in the primary transfer unit impresses on the transfer belt 6 the bias voltage supplied from the bias power source, and transfers to the transfer belt 6 an image in the black toner K developed on the surface of the photosensitive drum 11.

A secondary transfer roller 15 is pressed against the following roller 8 over which the transfer belt 6 is looped on the right end in the figure via the transfer belt 6, and here a secondary transfer unit is formed. A bias voltage is supplied from an unrepresented bias power source to the secondary transfer roller 15.

The secondary transfer roller 15 in the secondary transfer unit impresses on the transfer belt 6 the bias voltage supplied from the bias power source, and transfers the image in black toner K primarily transferred to the transfer belt 6 to the thermal expansion sheet 17 conveyed from the bottom in the figure as shown by the arrow along an image creation conveyance route 16.

The thermal expansion sheet 17 has encapsulated thermally expansive microspheres on a base sheet, and for example it is possible to use a sheet available on the market on which thermally expansive spheres 10-30 μm in diameter in which propane, butane or some other substance with low boiling point is microencapsulated with a thermoplastic resin such as vinylidene chloride acrylonitrile, methacrylate ester-acrylate copolymer, vinylidene chloride-acrylate ester copolymer, are coated and dried on a base sheet using a thermoplastic coating such as a vinyl acetate polymer or an acrylate polymer.

The above-described thermal expansion sheet 17 is loaded and stored in a thermal expansion sheet storage unit 18 composed of a paper cassette and/or the like, and the topmost sheet is taken out by an unrepresented paper roller and/or the like, is sent to the image creation conveyance route 16, is further conveyed along an image creation conveyance route 19, and the image in black toner K is transferred thereto while the sheet traverses the above-described secondary transfer unit.

The thermal expansion sheet 17 that has traversed the secondary transfer unit while the image in black toner K is transferred is conveyed to a fixing unit 21 along a fixing conveyance route 19. The thermal expansion sheet 17 is interposed between a heating roller 22 and a pressing roller 23 in the fixing unit 21 and is conveyed while being heated and pressed.

Through this, the thermal expansion sheet 17 has the secondarily transferred image in black toner K fixed to the paper surface and is further conveyed by the heating roller 22 and the pressing roller 23. Conveyance is handed over to the fixing unit discharge roller pair 24 and the sheet is discharged to the thermal expansion processing unit 3 above. The conveyance speed of the thermal expansion sheet 17 in the fixing unit 21 is relatively fast, so the black toner printing portion of the thermal expansion sheet does not expand due to the heat of the heating roller 22.

The thermal expansion processing unit 3 has a medium conveyance route 25 formed on the top, and four sets of conveyor roller pairs 26 (26a, 26b, 26c and 26d) are positioned along this medium conveyance route 25. Furthermore, a heat and light radiation unit 27 is positioned below substantially the center of the medium conveyance route 25.

The heat and light radiation unit 27 is composed of a halogen lamp 27a and a reflective minor 27b of substantially semicircular cross-section surrounding the bottom half of this halogen lamp 27a.

In this example, a 900 W halogen lamp 27a is used and is positioned at a location separated by 4c m from the surface of the thermal expansion sheet 17 being conveyed along the medium conveyance route 25. The conveyance speed of the conveyor roller pairs 26 conveying the thermal expansion sheet 17 is 20 mm/sec. Under these conditions, the thermal expansion sheet 17 is heated to 100° C. to 110° C., and the black-printed portion of the thermal expansion sheet 17 thermally expands.

The conveyance speed of the thermal expansion sheet 17 in the solid image printing unit 2 is quick while the conveyance speed of the thermal expansion sheet 17 in the thermal expansion processing unit 3 is slow, but thermal expansion sheets 17 are conveyed one at a time from the thermal expansion sheet storage unit 18, so successive conveyance is not accomplished until conveyance in the thermal expansion processing unit 3 is finished.

Accordingly, the thermal expansion sheet 17 conveyed in the thermal expansion processing unit 3 does not create troubles in conveyance as a whole by staying for a short time in a state bent by the conveyance route b between the fixing unit discharge roller pair 24 of the solid image printing unit 2 and the first conveyor roller pair 26a of the thermal expansion processing unit 3.

The thermal expansion sheet 17 that rises by the black solid printed part thermally expanding in the thermal expansion processing unit 3 is carried to the ink jet printer unit 4 along a conveyor route c.

The above-described conveyor roller pairs 26 may be composed of long roller pairs extending in the widthwise direction of the thermal expansion sheet 17 orthogonal to the direction of conveyance, or may be composed of short roller pairs that convey the thermal expansion sheet 17 by both sides thereof being interposed in between.

Figure 2:
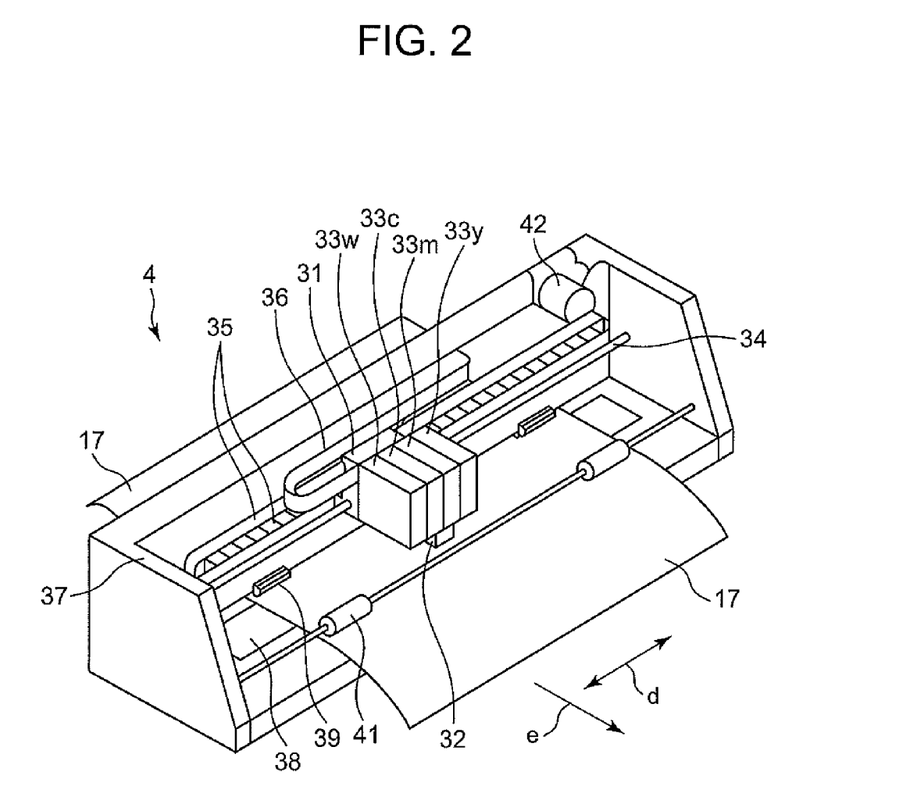
FIG. 2 is a perspective view showing the composition of an ink jet printer unit in a three-dimensional printing device according to Embodiments 1 and 2.

FIG. 2 is a perspective view showing the composition of the ink jet printer unit 4. The ink jet printer unit 4 shown in FIG. 2 has an internal frame 37 shown in FIG. 2 positioned between the conveyor route c shown in FIG. 1 and a medium discharge opening 28 on the outside of which a paper discharge tray 29 is provided.

The ink jet printer unit 4 is provided with a carriage 31 mounted so as to be capable of moving back and forth in a direction indicated by the bidirectional arrow d orthogonal to the direction of paper conveyance. Attached to the carriage 31 are a print head 32 for executing printing and ink cartridges 33 (33w, 33c, 33m and 33y) for storing ink.

The cartridges 33w, 33c, 33m and 33y store colored ink in white W, cyan C, magenta M and yellow Y, respectively. These cartridges are composed independently or with each ink chamber integrated in a single casing, and are connected to the print head 32 having nozzles for respectively spraying various colored ink.

In addition, the carriage 31 is supported in one direction by a guide rail 34 so as to be free to slide, and in the other direction is anchored to a toothed drive belt 35. Through this, the print head 32 and the ink cartridges 33 (33w, 33c, 33m and 33y) move back and forth with the carriage 31 in a direction orthogonal to the paper conveyance direction indicated by the bidirectional arrow d in the drawing, that is to say in the primary scanning direction of printing.

Between the print head 32 and a below-described control device of the three-dimensional printing device 1, a flexible communication cable 36 is connected via an internal frame 37. Through this flexible communication cable 36, print data and control signals from the control device are sent to the print head 32.

Facing this print head 32, a platen 38 is provided, extending in the above-described primary scanning direction of the print head 32 and comprising a portion of the paper conveyance route on the bottom side of the internal frame 37.

Contacting this platen 38, the thermal expansion sheet 17 is conveyed intermittently in the printing auxiliary scanning direction indicated by an arrow e in the drawing by a paper supply roller pair 39 (the bottom roller of which is not visible in the drawing, being in the shadow of the thermal expansion sheet 17) and a paper discharge roller pair 41 (the bottom roller of which is similarly not visible in the drawing, being in the shadow of the thermal expansion sheet 17).

During the periods of stoppage during the intermittent conveyance of this thermal expansion sheet 17, the print head 32 prints on the paper surface by spring ink droplets in a condition close to the thermal expansion sheet 17 while being driven by a motor 42 via the toothed driving belt 35 and the carriage 31. By repeating this intermittent conveyance of the thermal expansion sheet 17 and the printing during back-and-forth movement by the print head 32 in this manner, printing is accomplished on the entire surface of the thermal expansion sheet 17.

When printing by overlaying full-color printing on a white coating as described below, the white-printed thermal expansion sheet 17 is conveyed in the reverse direction of the printing auxiliary scanning direction indicated by the arrow e, and full-color printing is then accomplished while this sheet is again conveyed in the direction of the arrow e.

Figure 3:
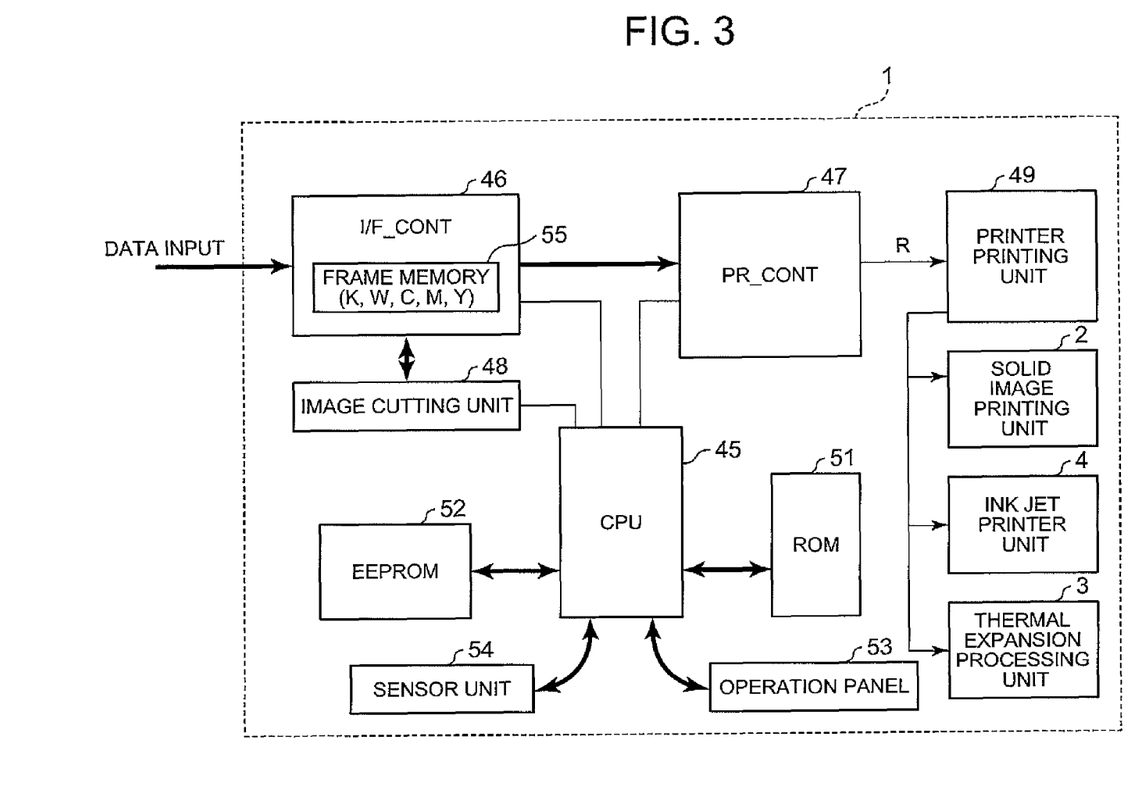
FIG. 3 is a circuit block diagram including a control device of a three-dimensional printing device according to Embodiments 1 and 2.

FIG. 3 is a circuit block diagram including the control device of the three-dimensional printing device 1 having the above-described composition. As shown in FIG. 3, the circuit block is centered on a CPU (central processing unit) 45, and an I/F_CONT (interface controller) 46, a PR_CONT (printer controller) 47 and an image cutting unit 48 are connected via respective data buses to this CPU 45.

A printer printing unit 49 is connected to the above-described PR_CONT 47. In addition, the image cutting unit 48 is connected in the other direction to the I/F_CONT 46 also. In this image cutting unit 48, an image processing application similar to those loaded in a personal computer and/or the like is loaded.

A ROM (read only memory) 51, an EEPROM (electrically erasable programmable ROM) 52, an operation panel 53 of a main body operation unit and a sensor unit 54 into which output from sensors positioned in various units is input are connected to the CPU 45. The ROM 51 stores system programs. The operation panel 53 is provided with a touch-type display screen.

The CPU 45 reads a system program stored in the ROM 51 and accomplishes processing by controlling each unit in accordance with the system program read.

That is to say, in each unit, first the I/F_CONT 46 converts print data supplied from host equipment such as a personal computer, for example, into bitmap data and deploys this to a frame memory 55.

In the frame memory 55, memory areas are set up corresponding to the print data of the black toner K and the respective print data of the white W, cyan C, magenta M and yellow Y colored ink, and the print data of images in each of the above-described colors are deployed to this memory area. The deployed data is output to the PR_CONT 47 and is output from the PR_CONT 47 to the printer printing unit 49.

The printer printing unit 49 is an engine unit, and under control from the PR_CONT 47 controls the impressed voltage on the photosensitive drum 11 of the solid image printing unit 2 shown in FIG. 1, the rotational drive system including the primary transfer roller 14, the initializing charger omitted from the drawing in FIG. 1 and the image creation unit 9 having driven units such as read/write heads and/or the like, and the process load such as driving of the transfer belt 6 and the fixing unit 21.

Furthermore, the printer printing unit 49 controls driving of the four sets of conveyor roller pairs 26 in the thermal expansion processing unit 3 shown in FIG. 1 and light-emitting driving of the heat and light radiation unit 27, and the timing thereof. Furthermore, the printer printing unit 49 further controls the actions of each part of the ink jet printer unit 4 shown in FIGS. 1 and 2.

Furthermore, the image data in black toner K output from the PR_CONT 47 is supplied to an optical writing head omitted from the drawing in the image creation unit 9 of the solid image printing unit 2 shown in FIG. 1 from the printer printing unit 49.

In addition, the respective image data of the white W, cyan C, magenta M and yellow Y color ink output from the PR_CONT 47 is supplied to the print head 32 shown in FIG. 2.

Embodiment 1

Figure 4A:
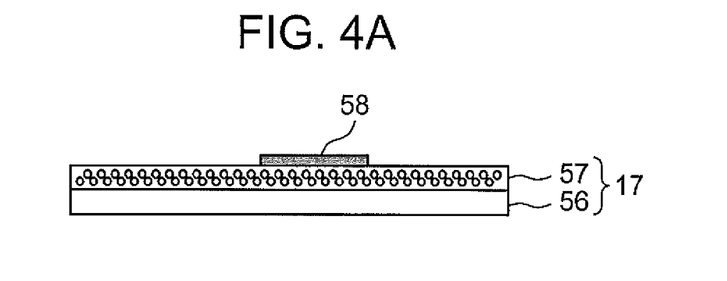
FIGS. 4A to 4C are drawings showing a basic overview for creating the three-dimensional surface on a thermal expansion sheet of the present invention in Embodiment 1.
Figure 4B:
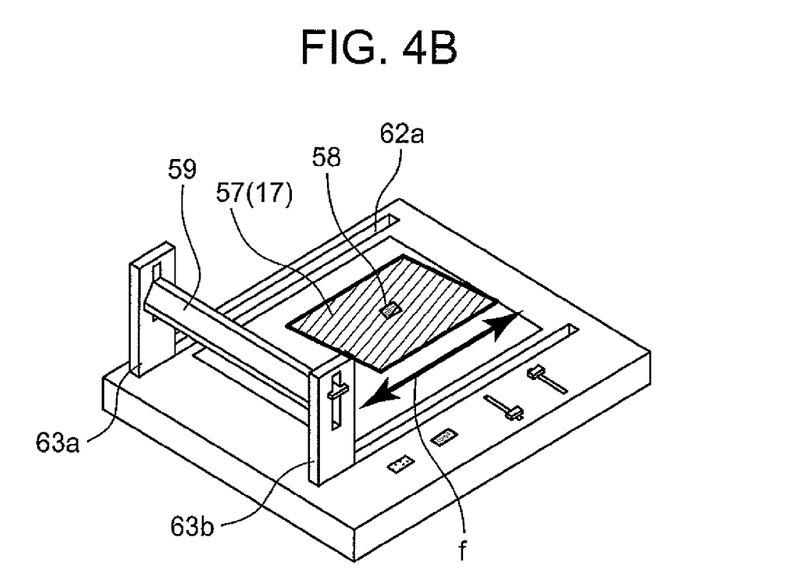
Figure 4C:
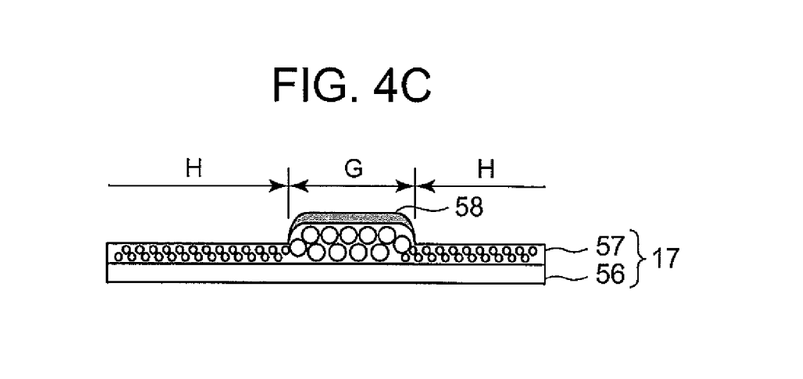

FIGS. 4A, 4B and 4C are drawings showing a basic overview for creating a three-dimensional surface on the thermal expansion sheet 17 in a first embodiment of the three-dimensional printing device 1 having the above-described composition. FIG. 4A is a drawing showing the composition of the thermal expansion sheet 17 used in Embodiment 1, FIG. 4B is a drawing explaining the principle of processing by selectively foaming and causing partial bulging of the thermal expansion sheet 17, and FIG. 4C is a cross-sectional view showing the processing results.

As shown in FIG. 4A, the thermal expansion sheet 17 is composed of a base material 56, and a foaming resin layer 57 including a thermal foaming agent coated on this base material 56. The base material 56 is not particularly limited in the type of substance used, and may be composed of paper, a cloth such as canvas cloth and/or the like, or a panel material such as plastic and/or the like. For the thermal expansion sheet 17 composed of this base material 56 and the foaming resin layer 57 including a thermal foaming agent, it is possible to use a commonly known product available in the market (for example, one sold by Matsumoto Yushi-Seiyaku Co. Ltd. of Japan).

A below-described black toner solid image 58 is printed in the solid image printing unit 2 of FIG. 1 in the part where the foaming resin layer 57 of this thermal expansion sheet 17 is to become three-dimensional. Furthermore, the surface of the foaming resin layer 57 of the thermal expansion sheet 17 on which the black toner solid image 58 is printed is heated by a heat-source heater 59, as shown in FIG. 4B.

FIG. 4B is a drawing showing a basic overview, and although the composition differs from that of the thermal expansion processing unit 3 shown in FIG. 1, the principle is the same. That is to say, as shown in FIG. 4B the thermal expansion sheet 17 is anchored by being mounted on a mounting stand 61, the surface on which the black toner solid image 58 is printed facing upward.

Guide grooves 62 (62a, 62b) are formed on both side ends of the mounting stand 61, and following these guide grooves 62, heat-source heater support pillars 63 (63a, 63b) capable of moving back and forth as indicated by a bidirectional arrow f are established.

The heat-source heater 59 supported on both ends by these heat-source heater support pillars 63 moves in accordance with the movement of the heat-source heater support pillars 63, while emitting thermal radiation to the surface of the foaming resin layer 57 of the thermal expansion sheet 17. That is to say, while the thermal expansion sheet 17 and the heat-source heater 59 are moving relative to each other, thermal radiation is emitted toward the surface of the foaming resin layer 57.

Through this, the black toner solid image 58 absorbs the thermal radiation and transmits that heat to the thermal foaming agent included in the foaming resin layer 57, and the thermal foaming agent causes a thermal expansion reaction, so that the part G on which the black toner solid image 58 is printed in the thermal expansion sheet 17 expands and rises.

In this manner, the printing surface of the thermal expansion sheet 17 that has been heated by the heat-source heater 59 becomes three-dimensional, only the foaming agent of the part G that has been printed with black toner foaming due to the difference in heat absorption rates between the part G on which black toner in printed and a part H on which such has not been printed.

The above-described heat-source heater in the present example is a heat and light radiation unit 27 composed of a halogen lamp 27a and a reflective mirror 27b as described above, and the above-described relative motion of the thermal expansion sheet 17 and the heat-source heater 59 in the thermal expansion process unit 3 of the present example is accomplished by the heat and light radiation unit 27 being anchored and the thermal expansion sheet 17 moving by being conveyed by the conveyor roller pair 26.

Figure 5A:
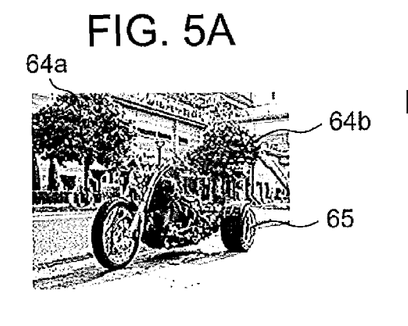
FIGS. 5A to 5G are drawings explaining the processing procedures for three-dimensional image printing executed by the control device of the three-dimensional printing device in Embodiment 1.

FIGS. 5A to 5G are drawings for explaining the processing procedures of three-dimensional image printing executed by the control device of the three-dimensional printing device 1 having the above-described composition. The CPU 45 of the control device first takes in image data of a digital image photographing a three-wheeled motorcycle 65 stopped on a road with two large roadside trees 64 (64a, 64b) in the background, for example as shown in FIG. 5A, as original image data from the outside, through the I/F_CONT 46.

Figure 5B:
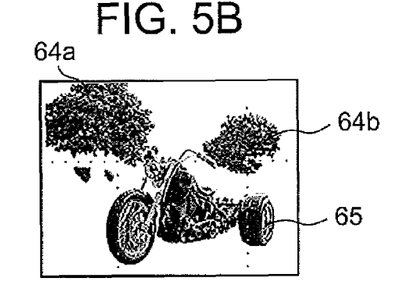

Next, through the image cutting unit 48 the CPU 45 cuts off the images of the three-wheeled motorcycle 65 and the two roadside trees 64 (64a, 64b) that are the images selected and indicated as parts to be made three-dimensional from the original image data via the operation panel by a user of the three-dimensional printing device 1, as shown in FIG. 5B. This cutting of the desired image is prepared with a general image processing application at present.

In addition to cutting the selected part manually as described above, image cutting includes automatically cutting by setting a threshold value for remote data on the order of two stages and setting a high-low difference because remote data is included in the image shot by the three-dimensional camera, for example.

Figures 5C, 5D, 5G:
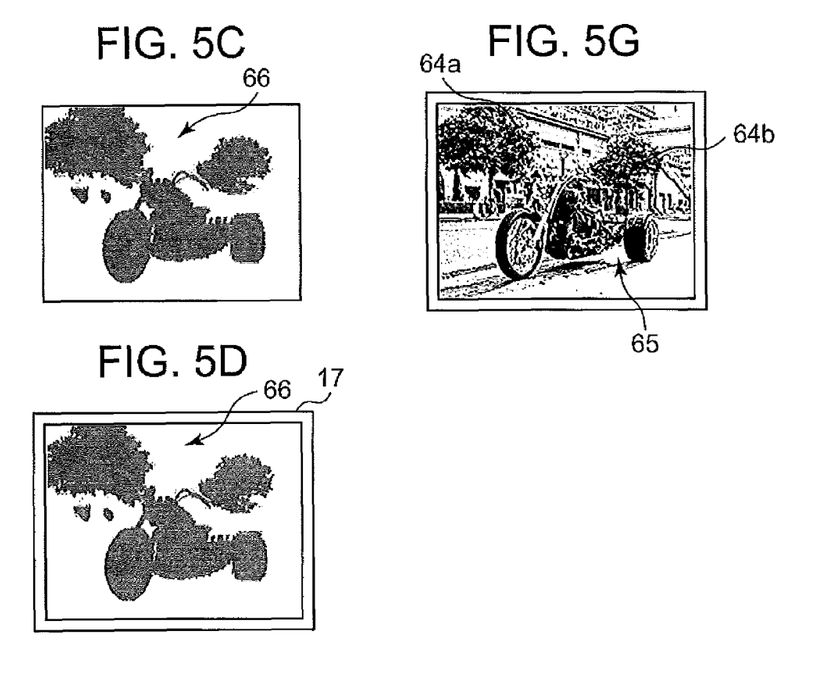

Next, the CPU 45 converts the above-described cut-out image into a solid black image 66, as shown in FIG. 5C. Conversion to this solid black image 66 can also be easily executed by an image processing application loaded in the image cutting unit 48.

The image data of this solid black image 66 is sent to the printer printing unit 49 via the I/F_CONT 46 and the PR_CONT 47. The printer printing unit 49 controls the solid image printing unit 2 and prints the solid black image 66 on the surface of the thermal expansion sheet 17, as shown in FIG. 5D.

Printing of the solid black image 66 in the present example consists of printing with black toner through an image creation device having an electronic photography format, but this may also be done by printing in black ink using an ink jet printer.

Figure 5E:
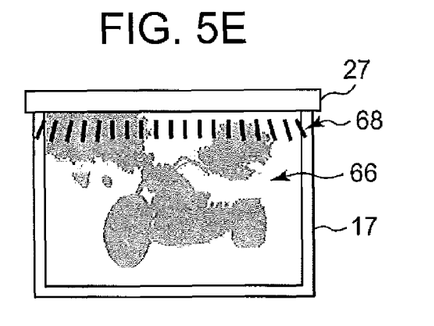

Next, the CPU 45 controls the thermal expansion processing unit 3, projects heat and light rays 68 as shown in FIG. 5E by means of the heat and light radiation unit 27 toward the thermal expansion sheet 17 conveyed by the four sets of conveyor roller pairs 26, and causes the solid black image printing part G (the solid black image 66 in FIG. 5E) to expand, as shown in FIG. 4C.

Figure 5F:
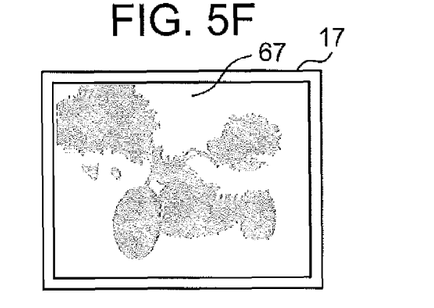

Next, the CPU 45 controls the ink jet printer unit 4 and prints solid white 67, as shown in FIG. 5F, by white W colored ink in the cartridge 33w onto the surface of the thermal expansion sheet 17 whose solid black image 66 part has risen.

Next, the CPU 45 drives the paper supply roller pair 39 and the paper discharge roller pair 41 in reverse, conveying the thermal expansion sheet 17 on which solid white was printed in a direction opposite that of the printing auxiliary scanning direction indicated by the arrow e. Furthermore, while again being conveyed in the direction of the arrow e, full-color printing is accomplished on the surface of the thermal expansion sheet 17 whose entire surface became solid white 67, including the risen portion of the solid black image 66 part.

With this process, printing is accomplished on the basis of the former original image from which selection pieces were cut off, using cyan C, magenta M and yellow Y colors in of the ink cartridges 33c, 33m and 33y.

The thermal expansion sheet 17 on which full color printing has finished is discharged onto the paper discharge tray 29 via the medium discharge opening 28. FIG. 5G shows a three-dimensional image discharged onto the paper discharge tray 29.

This three-dimensional image is such that the two roadside trees 64a and 64b and the three-wheeled motorcycle 65 rise more than the other parts, although such is not definitely visible in the drawing. Furthermore, because printing of the image occurred after this rising, there is no cracking such as cracking of the risen part.

In the present embodiment, the surface of the thermal expansion sheet 17 is uneven due to the risen part of the solid black image 66 part, so as the printing method at least when accomplishing full-color printing, an ink jet recording method capable of printing without contact on the uneven surface is preferably used.

In addition, in the above-described Embodiment 1, as an after process a varnish coating and/or the like may be applied either manually or automatically by the printer to the surface of the thermal expansion sheet 17 after printing has finished in order to impart luster.

Embodiment 2

Figure 6A:
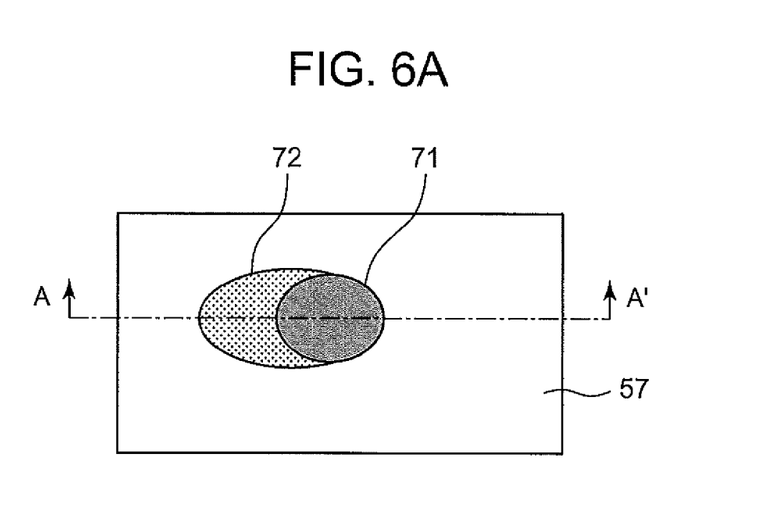
FIGS. 6A to 6C are drawings showing the basic principle for creating three-dimensional images on the thermal expansion sheet of the present invention in Embodiment 2.
Figure 6B:
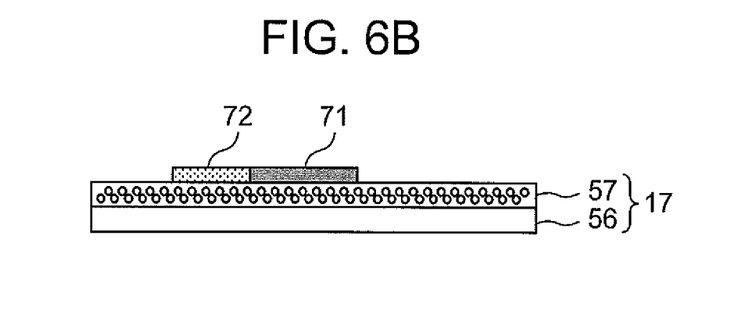
Figure 6C:
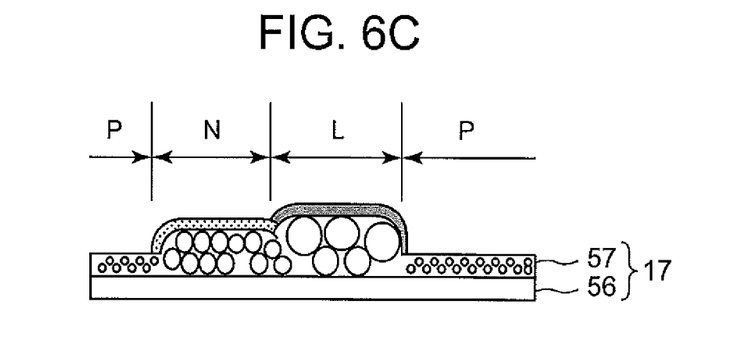

FIGS. 6A to 6C are drawings showing the basic principle of the process in Embodiment 2, in the three-dimensional printing device 1. FIG. 6A is a planar view of the thermal expansion sheet 17 with the surface having the foaming resin layer 57 on top and FIG. 6B is a cross-sectional view taken along line A-A'. On the surface of the foaming resin layer 57, the concentration of the black printing changes, so that a solid black image 71 and a solid gray image 72 are printed.

Because the concentration of black differs between the solid black image 71 and the solid gray image 72, the heat absorbency differs as well. Accordingly, when the heating and foaming process is conducted on this thermal expansion sheet 17, the part L of the solid black image 71 of the foaming resin layer 57 rises greatly through thermal expansion, as shown in FIG. 6C.

Furthermore, the part N of the solid gray image 72 rises through thermal expansion but rises less than the part L of the solid black image 71, so overall a two-level three-dimensional object is obtained. In this explanation of the basic principle, two levels are used, but this is not limited to two levels. If the concentration of black is three or more levels, a three-dimensional object of three or more levels can be obtained.

Figure 7:
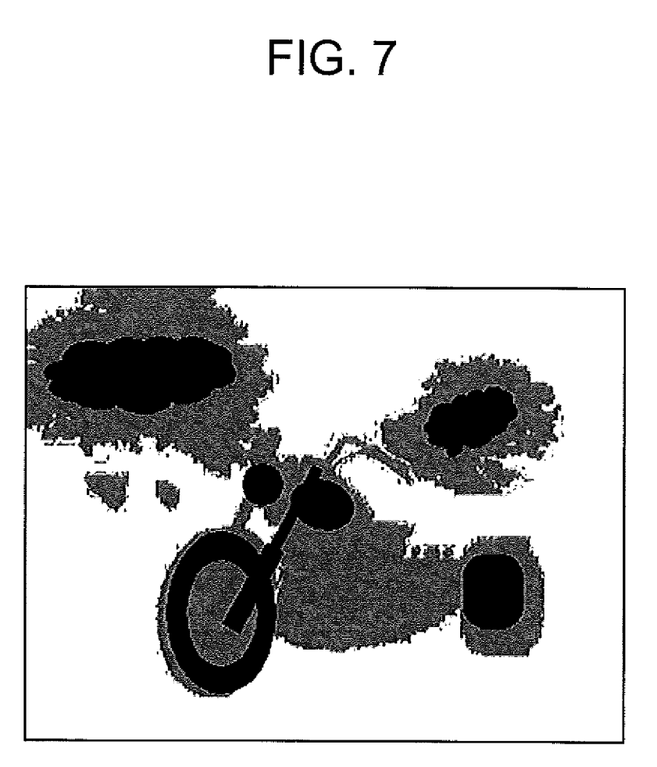
FIG. 7 is a drawing in which an image extracted from digital original image data when accomplishing two-step three-dimensional printing on an image in Embodiment 2 is converted into solid gray and solid black image data, and is a drawing printed on a thermal expansion sheet.

FIG. 7 is a figure in which the image cut out from the digital original image data shown in FIG. 6A is converted into two-level solid concentration image data of solid gray and solid black when accomplishing two-level three-dimensional printing on an image, and is an image in which that two-level solid concentration image is printed on the thermal expansion sheet 17. The process procedures thereafter are the same as in Embodiment 1.

In this embodiment, the motorcycle as a whole becomes three-dimensional and by having a black printing part of high concentration, the tire part, tank part, spokes part and headlight part are further made three-dimensional along with the central leafy part of the roadside trees, thereby making such jump forward and be emphasized, as shown in FIG. 7.

In the embodiments of the present invention for creating three-dimensional printed objects, with the above-described embodiments an example was explained of a three-dimensional printing device 1 in which a device body illustrated as a solid image printing unit 2 in the bottom-most part, a thermal expansion processing unit 3 above such, and an ink jet printer unit 4 in the top-most part are integrated, as shown in FIGS. 1 to 3, but these various parts may be respectively independent devices, and a printing system may be comprised by linking these various devices.

That is to say, in the above-described embodiments the image cutting unit 48 is provided in the solid image printing unit 2, but these processes may be accomplished by host equipment such as a personal computer, and the solid image printing unit 2 and the ink jet printing unit 4 may respectively be a stand-alone electronic photography printer and ink jet printer, and a system may be composed with the thermal expansion processing unit 3 also an independent device.

In this case, it is possible to compose the system by linking the various devices that should execute the procedures for creating the three-dimensional printed material, and naturally human intervention between the various procedures is possible.

Having described and illustrated the principles of this application by reference to one preferred embodiment, it should be apparent that the preferred embodiment may be modified in arrangement and detail without departing from the principles disclosed herein and that it is intended that the application be construed as including all such modifications and variations insofar as they come within the spirit and scope of the subject matter disclosed herein.

What is claimed is:

1. A three-dimensional printing device comprising:
   an image extractor that extracts selectively designated section from an image to be printed;
   an image converter that converts the designated section extracted by the image extractor into an image with a color having a higher thermal energy absorbency than section other than the designated section;
   a converted image printer that prints the converted image converted by the image converter onto a foaming layer surface of a thermal expansion sheet;
   a sheet surface raiser that applies thermal energy to the thermal expansion sheet on which the converted image is printed by the converted image printer, and causes the printed section of the converted image to expand and rise;
   a background color printer that prints a prescribed color that is a background color on the surface of the foaming layer surface of the thermal expansion sheet containing section raised by the sheet surface raiser; and
   an image printer that prints the image to be printed on the surface on which the prescribed color was printed by the background color printer.

2. The three-dimensional printing device according to claim 1, wherein the image in the color having the higher thermal energy absorbency is a solid black image and the prescribed color is white.

3. The three-dimensional printing device according to claim 1, wherein the image to be printed is a color image.

4. The three-dimensional printing device according to claim 1, further comprising a sheet supplier that supplies the thermal expansion sheet.

5. A three-dimensional printing system comprising:
- an image extractor that extracts selectively designated section from an image to be printed;
- an image converter that converts the designated section extracted by the image extractor into an image with a color having a higher thermal energy absorbency than section other than the designated section;
- a converted image printer that prints the converted image converted by the image converter onto a foaming layer surface of a thermal expansion sheet;
- a sheet surface raiser that applies thermal energy to the thermal expansion sheet on which the converted image is printed by the converted image printer, and causes the printed section of the converted image to expand and rise;
- a background color printing device that prints a prescribed color that is a background color on the surface of the foaming layer surface of the thermal expansion sheet containing section raised by the sheet surface raiser; and
- an image printing device that prints the image to be printed on the surface on which the prescribed color was printed by the background color printer.

6. The three-dimensional printing system according to claim 5, wherein the image in the color having the higher thermal energy absorbency is a solid black image and the prescribed color is white.

7. The three-dimensional printing system according to claim 5, wherein the image to be printed is a color image.

8. A three-dimensional printing method comprising:
- extracting selectively designated section from an image to be printed;
- converting the designated section that were extracted into an image with a color having a higher thermal energy absorbency than section other than the designated section;
- printing the converted image that was converted onto a foaming layer surface of a thermal expansion sheet;
- applying thermal energy to the thermal expansion sheet on which the converted image is printed, and causing the printed section of the converted image to expand and rise;
- printing a prescribed color that is a background color on the surface of the foaming layer surface of the thermal expansion sheet containing section that were raised; and
- printing the image to be printed on the surface on which the prescribed color was printed.

9. The three-dimensional printing method according to claim 8, wherein the image in the color having the higher thermal energy absorbency is a solid black image and the prescribed color is white.

10. The three-dimensional printing method according to claim 8, wherein the image to be printed is a color image.

11. A three-dimensional printing device comprising:
- an image extractor that extracts selectively designated sections having differing degrees of rising from an image to be printed;
- an image converter that converts the designated sections extracted by the image extractor into a first color image having a higher thermal energy absorbency than section other than the designated sections, and a second color image having a higher thermal energy absorbency than the first color image;
- a converted image printer that prints the converted image converted by the image converter onto a foaming layer surface of a thermal expansion sheet;
- a sheet surface raiser that applies thermal energy to the thermal expansion sheet on which the converted image is printed by the converted image printer, and causes the printed sections of the converted image to expand and rise;
- a background color printer that prints a prescribed color that is a background color on the surface of the foaming layer surface of the thermal expansion sheet containing sections raised by the sheet surface raiser; and
- an image printer that prints the image to be printed on the surface on which the prescribed color was printed by the background color printer.

12. The three-dimensional printing device according to claim 11, wherein the first color image is a solid gray image, the second color image is a solid black image and the prescribed color is white.

13. The three-dimensional printing device according to claim 11, wherein the image to be printed is a color image.

14. The three-dimensional printing device according to claim 11, further comprising a sheet supplier that supplies the thermal expansion sheet.

15. A three-dimensional printing system comprising:
- an image extractor that extracts selectively designated sections having differing degrees of rising from an image to be printed;
- an image converter that converts the designated sections extracted by the image extractor into a first color image having a higher thermal energy absorbency than section other than the designated sections, and a second color image having a higher thermal energy absorbency than the first color image;
- a converted image printing device that prints the converted image converted by the image converter onto a foaming layer surface of a thermal expansion sheet;
- a sheet surface raising device that applies thermal energy to the thermal expansion sheet on which the converted image is printed by the converted image printer, and causes the printed sections of the converted image to expand and rise;
- a background color printing device that prints a prescribed color that is a background color on the surface of the foaming layer surface of the thermal expansion sheet containing sections raised by the sheet surface raiser; and
- an image printing device that prints the image to be printed on the surface on which the prescribed color was printed by the background color printer.

16. The three-dimensional printing system according to claim 15, wherein the first color image is a solid gray image, the second color image is a solid black image and the prescribed color is white.

17. The three-dimensional printing system according to claim 15, wherein the image to be printed is a color image.

18. A three-dimensional printing method comprising:
- extracting selectively designated sections having differing degrees of rising from an image to be printed;
- converting the designated sections that were extracted into a first color image having a higher thermal energy absorbency than section other than the designated sections, and a second color image having a higher thermal energy absorbency than the first color image;

printing the converted image that was converted onto a foaming layer surface of a thermal expansion sheet;

applying thermal energy to the thermal expansion sheet on which the converted image is printed, and causing the printed sections of the converted image to expand and rise;

printing a prescribed color that is a background color on the surface of the foaming layer surface of the thermal expansion sheet containing raised sections; and printing the image to be printed on the surface on which the prescribed color was printed.

19. The three-dimensional printing method according to claim 18, wherein the first color image is a solid gray image, the second color image is a solid black image and the prescribed color is white.

20. The three-dimensional printing method according to claim 18, wherein the image to be printed is a color image.

* * * * *